(12) United States Patent
Gupta et al.

(10) Patent No.: US 11,967,984 B2
(45) Date of Patent: Apr. 23, 2024

(54) CONTROL PLANE TRIGGERED (CPT) OPTICAL PROTECTION SWITCHING (OPS)

(71) Applicant: Ciena Corporation, Hanover, MD (US)

(72) Inventors: Sandeep Kumar Gupta, Gurgaon (IN); Vikas Chander, Sonipat (IN); Manish Aggarwal, New Delhi (IN); Parmita Kandiyal, Gurgaon (IN)

(73) Assignee: Ciena Corporation, Hanover, MD (US)

( * ) Notice: Subject to any disclaimer, the term of this patent is extended or adjusted under 35 U.S.C. 154(b) by 108 days.

(21) Appl. No.: 17/835,084

(22) Filed: Jun. 8, 2022

(65) Prior Publication Data
US 2023/0344513 A1 Oct. 26, 2023

(30) Foreign Application Priority Data
Apr. 26, 2022 (IN) .............................. 202211024558

(51) Int. Cl.
*H04B 10/032* (2013.01)
*H04J 14/02* (2006.01)
*H04Q 11/00* (2006.01)

(52) U.S. Cl.
CPC ........ *H04B 10/032* (2013.01); *H04J 14/0287* (2013.01); *H04Q 11/0062* (2013.01); *H04Q 2011/0081* (2013.01)

(58) Field of Classification Search
CPC .......... H04B 10/03–038; H04J 14/0287–0297; H04Q 2011/0081; H04Q 11/0062
USPC .............................................. 398/1–5, 45–57
See application file for complete search history.

(56) References Cited

U.S. PATENT DOCUMENTS

| | | | |
|---|---|---|---|
| 7,339,889 B2 | 3/2008 | Lee et al. | |
| 8,199,750 B1 | 6/2012 | Schultz et al. | |
| 8,553,707 B2 | 10/2013 | Swinkels et al. | |
| 8,854,955 B2 * | 10/2014 | Prakash | H04B 10/032 370/228 |
| 9,118,421 B2 | 8/2015 | Swinkels et al. | |
| 9,236,953 B2 | 1/2016 | Chhillar et al. | |
| 9,882,634 B1 | 1/2018 | Al Sayeed et al. | |
| 9,918,148 B2 | 3/2018 | Swinkels et al. | |

(Continued)

FOREIGN PATENT DOCUMENTS

CN 102739308 A * 10/2012 ........... H04B 10/032

*Primary Examiner* — Li Liu
(74) *Attorney, Agent, or Firm* — Baratta Law PLLC; Lawrence A. Baratta, Jr.

(57) ABSTRACT

Systems and methods for performing a Control Plane Triggered (CPT) Optical Protection Switching (OPS) policy are provided. A method, according to one implementation, includes performing a first route switching procedure for switching routes between an originating node and a terminating node. The first route switching procedure is configured to operate at a first priority level according to an Optical Protection Switching (OPS) policy. The method also includes performing a second route switching procedure for switching routes between the originating node and the terminating node. The second route switching procedure is configured to operate at a second priority level according to a second protection policy, wherein the second priority level is higher than the first priority level. Also, the method includes reverting back to a home path according to the first route switching procedure after one or more faults, defects, or degradations have been cleared from the home path.

19 Claims, 10 Drawing Sheets

(56) References Cited

U.S. PATENT DOCUMENTS

| | | |
|---|---|---|
| 10,187,152 B2 | 1/2019 | Prakash et al. |
| 10,897,321 B1 * | 1/2021 | Al Sayeed .......... H04J 14/0204 |
| 2015/0188625 A1 * | 7/2015 | Park ................... H04Q 11/0062 |
| | | 398/2 |
| 2015/0244470 A1 * | 8/2015 | Chhillar ............... H04B 10/032 |
| | | 398/19 |
| 2015/0334004 A1 * | 11/2015 | Hussain .............. H04J 14/0291 |
| | | 398/5 |
| 2017/0163489 A1 | 6/2017 | Prakash et al. |
| 2018/0007147 A1 | 1/2018 | Sareen et al. |
| 2020/0036439 A1 * | 1/2020 | Chhillar .............. H04L 12/2801 |
| 2022/0029701 A1 | 1/2022 | Chhillar et al. |

* cited by examiner

CONTROL PLANE TRIGGERED (CPT) OPTICAL PROTECTION SWITCHING (OPS)

TECHNICAL FIELD

The present disclosure generally relates to networking systems and methods. More particularly, the present disclosure relates to route switching between an originating node and a terminating node. Multiple routing policies may be used for route switching, including a Control Plane Triggered (CPT) Optical Protection Switching (OPS) (CPT-OPS) policy.

BACKGROUND

FIG. 1 shows a conventional system 10 for performing an Optical Protection Switching (OPS) technique between a first node (i.e., Node A) and a second node (i.e., Node B). Nodes A and B are able to communicate with each other through a sub-network. In some cases, Node A may be referred to as an originating node and Node B may be referred to as a terminating node.

In particular, Node A includes at least an OPS device 12 and Node B includes at least an OPS device 14. The OPS device 12 of Node A includes a 1×2 splitter 16 and a 2×1 combiner 18. The 1×2 splitter 16 enables the transmission of optical signals to Node B via two paths and the 2×1 combiner 18 enables the reception of optical signals from Node B via one of these two paths. Also, the OPS device 14 of Node B includes a 2×1 combiner 20 for receiving optical signals from Node A over the two paths and a 1×2 splitter 22 for transmitting optical signals to Node A over the two paths.

For protection purposes, the output signals from the 1×2 splitter 16 are egressed at two different degrees 24, 26. That is, the output signal from the first degree 24 is transmitted along a "working" fiber pair 28 and the output signal from the second degree 26 is transmitted along a "protection" fiber pair 30. The working fiber pair 28 can be designated as the primary path along which signals are normally transmitted when there are no faults present. Nevertheless, the OPS device 12 is configured to alternatively transmit a protection signal (e.g., redundant, secondary, or backup signal) along the protection fiber pair 30 when there one or more faults detected via the working fiber pair 28 that will essentially affect one or more network services between Nodes A and B.

The two output signals are received at first and second degrees 32, 34 of Node B and supplied to a 2×1 combiner 20. The 2×1 combiner 20 may be configured as a switch for selecting the path along which a signal is received. For example, photo detectors may be arranged at the inputs of the 2×1 combiner 20 to determine which path is active and thereby switch to that path.

In a comparable manner, but in the opposite direction, Node B is configured to send optical signals to Node A via the working fiber pair 28 and protection fiber pair 30. For example, the 1×2 splitter 22 of Node B is configured to split an optical signal to egress the signals from the first and second degrees 32, 34 to the working fiber pair 28 and protection fiber pair 30, respectively. At Node A, the 2×1 combiner 18 is configured to receive ingress signals via degrees 24, 26 and switch to receive the active signal (e.g., based on photo detection at the inputs of the 2×1 combiner 18).

Thus, the OPS technique of the conventional system 10 includes the automatic protection actions for sending signals along two different paths, as needed. Therefore, if a fault is detected (e.g., a fiber cut) on the portion of the sub-network associated with the working fiber pair 28, then the signals can be switched to the backup path (e.g., protection fiber pair 30). Also, it may be noted that both paths (i.e., through fiber pairs 28, 30), in combination, can be referred to as a "home path." Thus, under OPS operation, two possible paths are considered to be part of the home path.

The conventional system 10 for performing OPS actions often allows a network administrator to choose between "revertive" operation and "non-revertive" operation. In revertive operation, when a fault is detected on the primary path (e.g., working fiber pair 28) and an OPS switching operation switches to the backup path (e.g., protection fiber pair 30), then the system 10 will automatically switch back (i.e., revert back) to the primary path when it has been determined that the fault has been cleared. Usually, the revertive action is performed after a Wait to Restore (WTR) timer expires. As the name suggest, the system 10 will be configured to wait a certain amount of time before restoring transmission to the original path (i.e., working fiber pair 28). Specifically, the WTR timer is used in order to minimize the number of switching events between the working fiber pair 28 and protection fiber pair 30, especially since an indication that a fault has been completely cleared can potentially be provided prematurely. Waiting through the WTR period is intended to prevent the occurrence of multiple protection switching actions due to intermittent occurrences of defects on the working fiber pair 28. The WTR timer may have a default of about one minute. Optionally, the WTR timer may be pre-set, for example, to several minutes by a network administrator. ITU-T G.808.1 recommends that the WTR period should be between 5 and 12 minutes.

As opposed to revertive operation where the system 10 automatically switches back to the working fiber pair 28, the system 10 may be configured to run in a non-revertive manner. When a fault is detected on the primary path and transmission is switched to the protection path, the system 10 (in non-revertive operation) will continue to run on the protection fiber pair 30 indefinitely (i.e., will not automatically revert back) until a network administrator manually switches back to the working fiber pair 28. Hence, there is no WTR timer in non-revertive operation.

However, there are certain shortcomings in the conventional system 10 of FIG. 1 and other similar systems. For example, in revertive OPS operation, the system 10 typically focus on the working leg (e.g., working fiber pair 28) for restoring back to this primary path, but typically the system 10 only considers the one direction from the originating node (e.g., Node A) to the terminating node (e.g., Node B). Thus, the system 10 does not always ensure that service is run on the home path along one of fiber pairs 28, 30. In other words, if another protection path is used (e.g., other than the two fiber pairs 28, 30 shown in FIG. 1), then Node B may not necessarily revert back to the working fiber pair 28 when faults are cleared on this path and the WTR timer has expired. Instead, Node B may switch to another path that may not be part of the home path that includes fiber pairs 28, 30. Therefore, revertive OPS operation might switch service to a non-preferred restoration path, even if the protection fiber pair 30 (of the home path) is available.

Another issue with the conventional system 10 is that manual switching of an OPS device 12, 14 by a network administrator may be based on a Sub-Network Connection (SNC) that is not on the home path. Since this manual switching will not be performed automatically, it can be time-consuming and inefficient. Also, involvement with the network administrator requires this expert to perform a sanity check on any alarms in this respect, which again can be time-consuming. This can be a cumbersome exercise for the network administrator to manually track traffic paths. Also, manual switching requires the two-step process for both the originating and terminating nodes. Therefore, there is a need in the field of networking to avoid the issues of the conventional system 10 and provide a system that can provide automatic switching to preferred paths (e.g., home paths) instead of restoration paths selected by other routing protocols to thereby provide at least two levels of routing.

BRIEF SUMMARY

The present disclosure is directed to systems and methods for enabling multiple policies or protocol to operate simultaneously, such as route switching policies for switching routes, as needed, between an originating node and a terminating node. The policies may operate on different priority or hierarchy levels, whereby one switching action may take place first. In some embodiments, an Optical Protection Switching (OPS) policy is used and may operate at a lower priority level than another route switching protocol, such as the Sub-Network Connection Protection (SNCP) protocol. Nevertheless, optimized home paths associated with OPS operation allow additional switching to switch to preferred routes, particularly after a fault or detect is cleared on a working path or protection path of the home route.

According to one implementation, a process for triggering an OPS operation may include a first step of performing a first route switching procedure for switching routes between an originating node and a terminating node. For example, the first route switching procedure is configured to operate at a first priority level according to an Optical Protection Switching (OPS) policy. The process also includes performing a second route switching procedure for switching routes between the originating node and the terminating node. The second route switching procedure is configured to operate at a second priority level according to a second protection policy, where the second priority level is higher than the first priority level. In addition, the process includes the step of reverting back to a home path according to the first route switching procedure after one or more faults, defects, or degradations have been cleared from the home path.

In some embodiments, the process may be configured to trigger an OPS request from a Layer 0 Control Plane (L0CP), which may be configured to control at least the originating node and terminating node. The process may also send the OPS request to one or more transponders associated with each of the originating node and terminating node. The OPS policy may include a parameter for designating an enabled state or a disabled state, where the enabled state may be configured to allow the L0CP to perform a Control Plane Trigger (CPT) switching action (CPT-OPS) when service is optimized on the home path.

Also, according to various embodiments, the home path may include a working path and a protection path. Each path (e.g., the working path and the protection path) includes one or more Channel Multiplexer/Demultiplexer (CMD) devices, one or more Wavelength Selective Switching (WSS) devices, and one or more sets of line amplifiers. Furthermore, the process may include detecting if paths are operational on the home path associated with the first route switching procedure and/or if paths are operational on a restoration path associated with the second route switching procedure. The process may also include using end-to-end diagnostics from the originating node to the terminating node to determine optimized routes.

According to some embodiments, the first protection policy may be configured to operate in a revertive manner for automatically reverting back to the home path after a Wait-to-Restore (WTR) time has expired. The second protection policy, for example, may be an end-to-end dedicated 1+1 path protection/restoration protocol. For instance, the second protection policy may be a Sub-Network Connection Protection (SNCP) protocol. The process 270 may also include the step of receiving manual switching instructions (e.g., from a network administrator) according to a third route switching procedure. The third route switching procedure may be configured to operate at a third priority level below the first and second priority levels.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1:
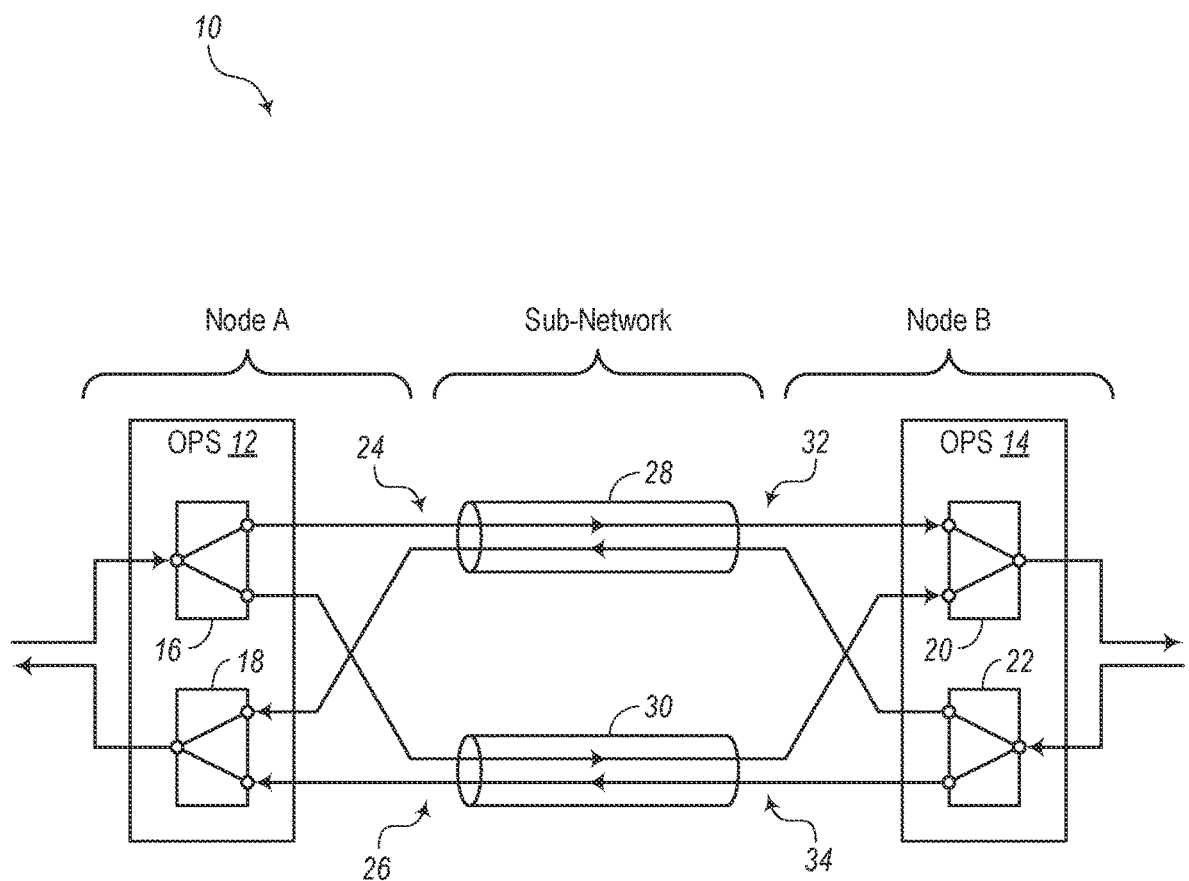
FIG. 1 is a schematic diagram illustrating an arrangement of a conventional sub-network for performing an Optical Protection Switching (OPS) policy.

The present disclosure relates to systems and methods for routing optical signals through an optical (photonic) network. As mentioned above, Optical Protection Switching (OPS) techniques can be used to predefine a "home path" that include a primary (working) path and a secondary (protection) path. Under OPS operation, a system will attempt to route traffic through these two paths. However, if one or more service-affecting faults are detected on one or both of these two paths, it may be necessary to use another routing protocol on top of the OPS techniques. For example, a higher priority path restoration technique may be used to automatically to another available path, regardless of whether this other path is part of the home path (e.g., working and protection paths of OPS).

The systems and methods of the present disclosure are configured to allow the operation of OPS techniques along with a higher-priority routing protocol. For example, after the higher-priority routing protocol switches to a non-preferred path when a fault is detected on the working path, the systems and methods of the present disclosure are configured to perform additional steps to switch operation back to a preferred path.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in several ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

Figure 2:
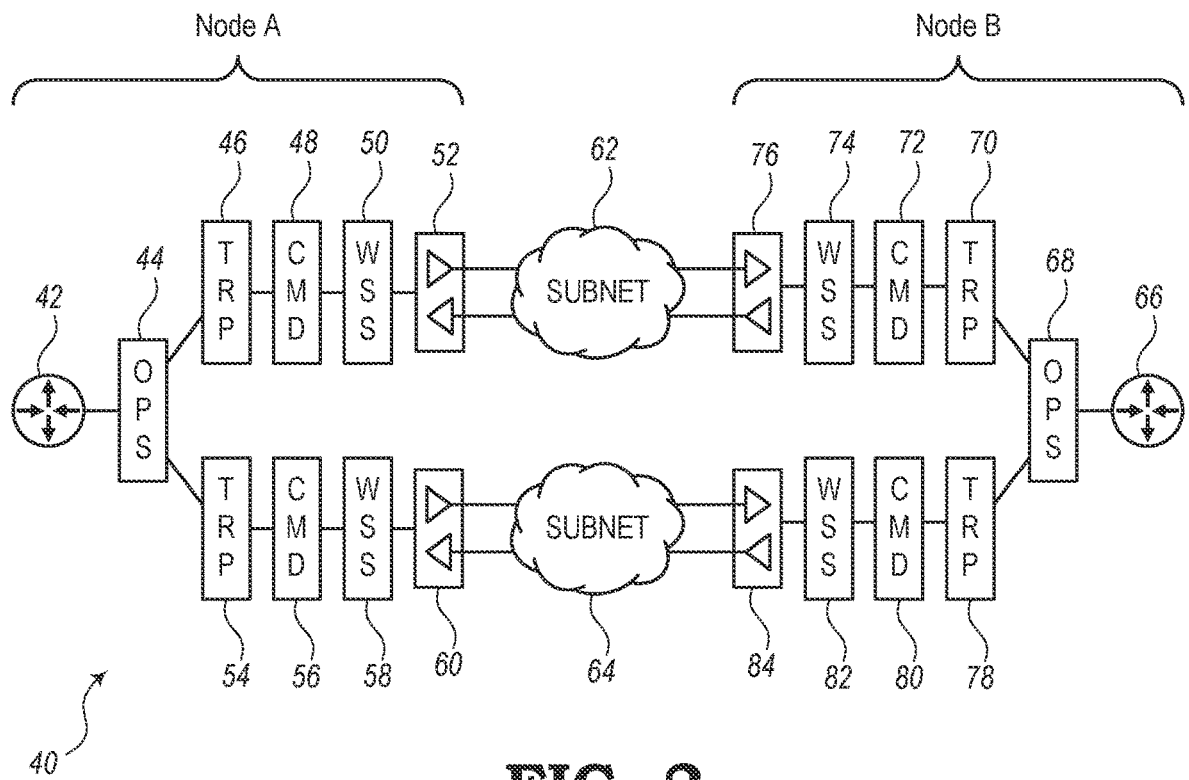
FIG. 2 is a schematic diagram illustrating a system configured to enable a client-controlled OPS policy, according to various embodiments.

FIG. 2 is a schematic diagram illustrating an embodiment of a system 40 configured to enable a client-controlled OPS policy. As illustrated, the system 40 includes components of Node A and components of Node B, separated by a network or sub-networks. For example, Node A includes at least a router 42, an OPS device 44, and two preferred paths that designated the home path. The first preferred path includes a transponder (TRP) 46, a Channel Multiplexer/Demultiplexer (CMD) device 48, a Wavelength Selective Switching (WSS) device 50, and amplifiers 52. The second preferred path includes a TRP 54, a CMD device 56, a WSS device 58, and amplifiers 60. The amplifiers 52 of the first preferred path are configured to communicate (i.e., transmit and receive) optical signals through a first sub-network 62 and the amplifiers 60 of the second preferred path are configured to communicate optical signals through a second sub-network 64.

Similarly, Node B includes at least a router 66, an OPS device 68, and two preferred paths that designated the home path. The first preferred path includes a TRP 70, a CMD device 72, a WSS device 74, and amplifiers 76. The second preferred path includes a TRP 78, a CMD device 80, a WSS device 82, and amplifiers 84. The amplifiers 76 of the first preferred path are configured to communicate optical signals through the first sub-network 62 and the amplifiers 84 of the second preferred path are configured to communicate optical signals through the second sub-network 64.

In the client OPS configuration of FIG. 2, a customer's router (e.g., router 42) is connected directly to the OPS device 44. The OPS device 44 is configured to switch connection between two different transponder clients (e.g., TRP 46, 54) for network protection on a path layer or hardware layer.

Figure 3:
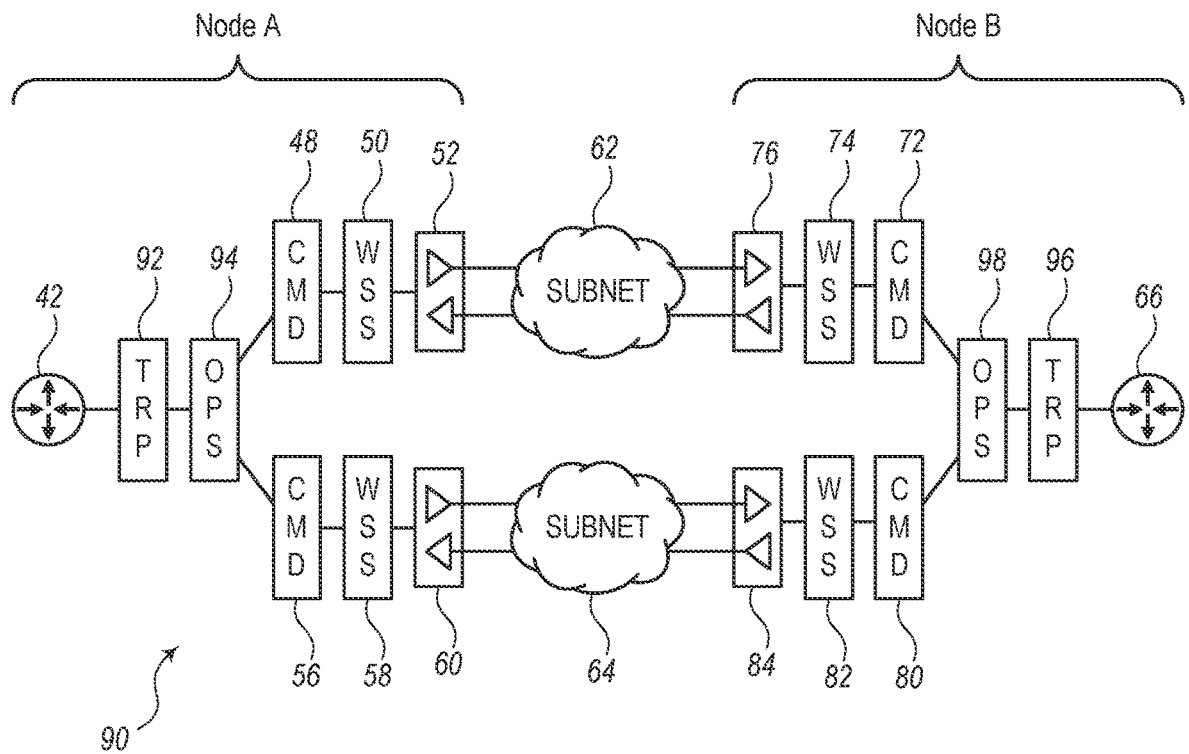
FIG. 3 is a schematic diagram illustrating a system configured to enable a transponder-controlled OPS policy, according to various embodiments.

FIG. 3 is a schematic diagram illustrating an embodiment of a system 90 configured to enable a transponder-controlled (or channel-controlled) OPS policy. As illustrated, the system 90 includes components of Node A and components of Node B, separated by a network or sub-networks. The system 90 is similar to the system 40 of FIG. 2, except that the position of the OPS devices and transponders are switched. For example, Node A includes at least the router 42, a single TRP, an OPS device 44, and two preferred paths that designated the home path. The first preferred path includes the CMD device 48, the WSS device 50, and the amplifiers 52. The second preferred path includes the CMD device 56, the WSS device 58, and the amplifiers 60. Again, the amplifiers 52 of the first preferred path are configured to communicate optical signals through the first sub-network 62 and the amplifiers 60 of the second preferred path are configured to communicate optical signals through the second sub-network 64.

Similarly, Node B includes at least the router 66, a TRP 96, an OPS device 98, and two preferred paths that designated the home path. The first preferred path includes the CMD device 72, the WSS device 74, and the amplifiers 76. The second preferred path includes the CMD device 80, the WSS device 82, and the amplifiers 84. Again, the amplifiers 76 of the first preferred path are configured to communicate optical signals through the first sub-network 62 and the amplifiers 84 of the second preferred path are configured to communicate optical signals through the second sub-network 64.

As shown in FIG. 3, the system 90 is configured for performing transponder-controlled OPS policies, Transponder-Triggered (TT) OPS (TT-OPS) policies, or channel-controlled OPS policies. For simplification, the term "TT-OPS" will be used in the present disclosure to describe this type of operation. In the TT-OPS configuration, the transponder line signal is protected on two different photonic paths.

Figure 4A:
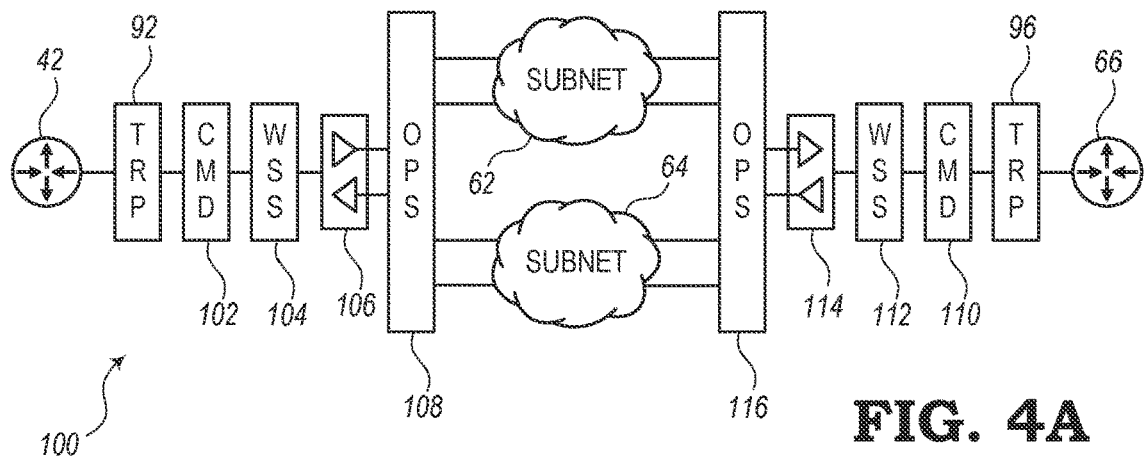
FIGS. 4A-4C are schematic diagrams illustrating systems configured to enable a span-controlled OPS policy, according to various embodiments.
Figure 4B:
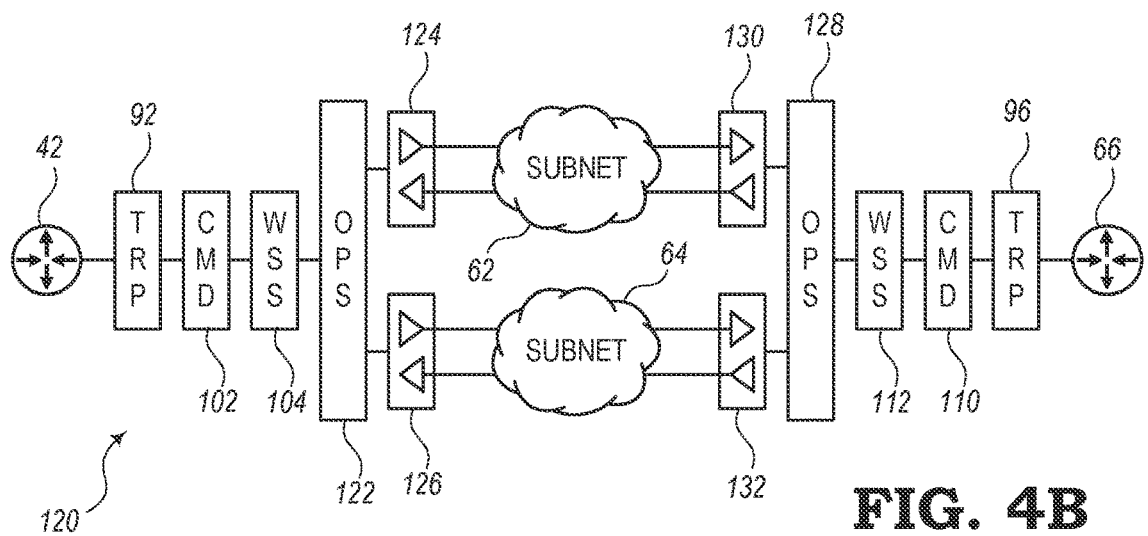
Figure 4C:
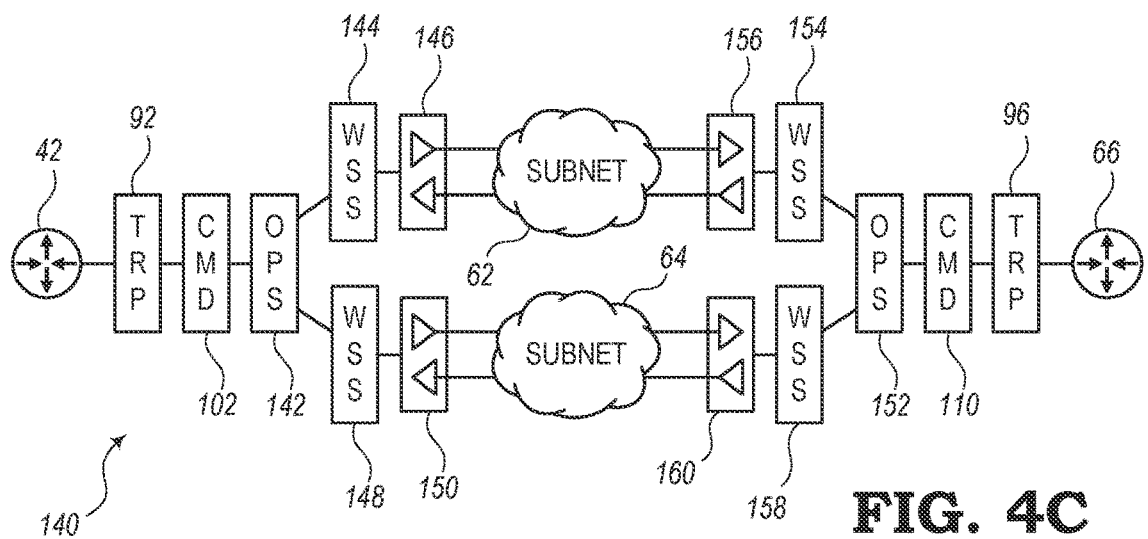

FIGS. 4A-4C are schematic diagrams illustrating embodiments of systems configured to enable a span-controlled OPS policy, where FIG. 4A shows amplifier-controlled operation, FIG. 4B shows directional WSS-controlled operation, and FIG. 4C shows CMD-controlled operation. This may also be referred to as span layer or trunk layer OPS operation. In the configuration shown in FIGS. 4A-4C, there can be three ways to protect the network by using OPS over a fiber span.

As shown in the embodiment of FIG. 4A, a system 100, which is configured to enable a span-controlled OPS policy, includes components of Node A and components of Node B, separated by a network or sub-networks 62, 64. The system 100 is similar to the system 40 of FIG. 2 and the system 90 of FIG. 3, except that the OPS devices are moved closer to the sub-networks 62, 64. For example, Node A includes at least the router 42, the TRP 92, a CMD device 102, a WSS device 104, amplifiers 106, and an OPS device 108. From the OPS device 108, two preferred paths designate a home path, where a first route through the sub-network 62 may represent a working route and a second route through the sub-network 64 may represent a protection route. Similarly, Node B includes at least the router 66, the TRP 96, a CMD device 110, a WSS device 112, amplifiers 114, and an OPS device 116. From the OPS device 116, the two preferred paths through the sub-networks 62, 64 represent the working route and protection route.

As shown in the embodiment of FIG. 4B, a system 120, which is configured to enable a span-controlled OPS policy, includes components of Node A and components of Node B, separated by a network or sub-networks 62, 64. The system 120 is similar to the system 100 of FIG. 4A, except that the positions of the OPS devices and amplifiers are switched. For example, Node A includes at least the router 42, the TRP 92, the CMD device 102, the WSS device 104, an OPS device 122, and two preferred paths through a first set of amplifiers 124 and a second set of amplifiers 126, where the preferred paths designate a home path, where a first route is configured to communicate through the sub-network 62 as a working route and a second route is configured to communicate through the sub-network 64 as a protection route. Similarly, Node B includes at least the router 66, the TRP 96, the CMD device 110, the WSS device 112, an OPS device 128, and two preferred paths through a first set of amplifiers 130 and a second set of amplifiers 132, where the preferred paths designate the home path through sub-networks 62, 64.

As shown in the embodiment of FIG. 4C, a system 140, which is configured to enable a span-controlled OPS policy, includes components of Node A and components of Node B, separated by a network or sub-networks 62, 64. The system 140 is similar to the systems 120 of FIG. 4B, except that the OPS devices and WSS devices are switched. For example, Node A includes at least the router 42, the TRP 92, the CMD device 102, an OPS device 142, and two preferred routes of a home path. The first preferred route (e.g., working route) includes a WSS device 144 and amplifiers 146 for communication through the sub-network 62 and the second preferred route (e.g., protection route) includes a WSS device 148 and amplifiers 150 for communication through the sub-network 64. Similarly, Node B includes at least the router 66, the TRP 96, the CMD device 110, and OPS device 152, and the two preferred routes of the home path. The first preferred route (e.g., working route) includes a WSS device 154 and amplifiers 156 for communication through the sub-network 62 and the second preferred route (e.g., protection route) includes a WSS device 154 and amplifiers 156 for communication through the sub-network 64.

To reiterate the issues with the conventional system 10 of FIG. 1, the systems 100, 120, 140 of FIGS. 4A-4C may be used to describe a Sub-Network Connection Protection (SNCP) policy having two routes (1+1) of a home path. In the case of a 1+1 service (e.g., SNCP) that is running between two different endpoints (e.g., Nodes A and B), the conventional system 10 does not provide a mechanism to ensure that client traffic should be operating on a corresponding SNCP route that is part of the home path. Since many customers may have a need to provide client services whereby operation on a SNCP leg is part of its home path, which thereby is better able to suit many customer requirements with respect to latency, distance, Optical Signal-to-Noise Ratio (OSNR), etc.

Suppose, for instance, that a 1+1 SNCP service is running between two points (Nodes A and B) and that a network administrator chooses a home path for the working and protection legs/routes. At any instance of time, there is a possibility that one leg of SNCP is running on its home path while the other is running on a path other than the home path. In this case, a downstream OPS device (at Node B), according to conventional systems, will not be aware of this situation. As a result, Node B may receive traffic on the SNCP leg that is not up on the home path. In the conventional systems, there is no such mechanism to instruct the downstream OPS device to switch to a different path to get the traffic up on the SNCP leg that is part of the home path.

Figure 5:
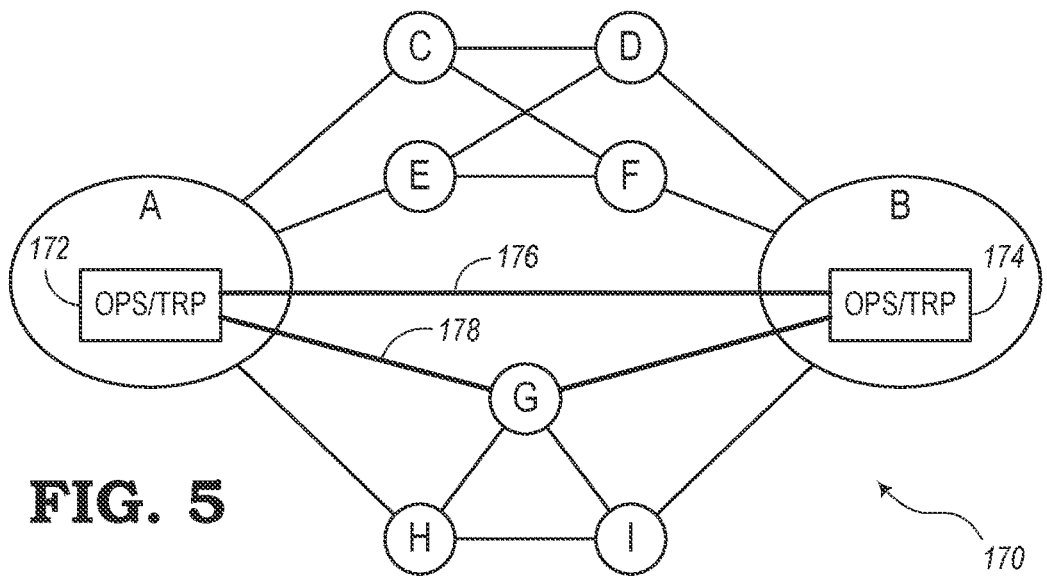
FIG. 5 is a diagram illustrating a system having a plurality of Network Elements (NEs) arranged in a mesh configuration for demonstrating OPS policies controlled by a Control Plane (CP), according to various embodiments.

FIG. 5 is a diagram illustrating an embodiment of a mesh network 170 having a plurality of Network Elements (NEs) (e.g., Nodes A, B, C, D, E, F, G, H, I) arranged in a configuration for demonstrating OPS policies controlled by a Control Plane (CP). In this example, Nodes A and B are designated as the two end points of concern, where Node A may be referred to as the originating node and Node B may be referred to as a termination node. For communicating optical signals from Node A to Node B, multiple routes may be available, such as, for example, a direct route (A-B) and other routes through one or more other NEs or nodes. Some of these other routes, for example, may include A-C-D-B, A-E-F-B, A-C-F-B, A-E-D-B, A-G-B, A-H-I-B, A-H-G-B, A-G-I-B, and so on.

In the illustrated embodiment, Node A includes at least an OPS device and/or transponder (OPS/TRP 172) and Node B includes at least an OPS/TRP 174. Preferably, Nodes A and B can be configured similar to the respective NEs or nodes of the system 40 of FIG. 2 to enable the OPS/TRPs 172, 174 to perform enable client-controlled OPS policies. Also, Nodes A and B can preferably be configured similar to the respective NEs or nodes of the system 90 of FIG. 3 to enable the OPS-TRPs 172, 174 to perform transponder-controlled or channel-controlled OPS policies. In other embodiments, Nodes A and B may be configured similar to the systems 100, 120, 140 of FIGS. 4A-4C.

As shown in FIG. 5, two routes may be pre-set as an OPS home path, including, for example, a working path 176 (e.g., direct route A-B) and a protection path 178 (e.g., route A-G-B). Thus, according to OPS operation, the preferred paths may include the home path, which includes the working path 176 and protection path 178. According to other routing protocols, other routes may be used for protection or backup, as needed, such as when either or both of the paths 176, 178 are unavailable due to any detected fault or degradation. However, it may be noted that even though other routes (e.g., A-C-D-B, A-E-F-B, A-H-I-B, etc.) are available and may be used in other routing protocols also running in the mesh network 170 along with the OPS operation, these other routes may not be preferred over the working path 176 and protection path 178 of the OPS operation. Nevertheless, the other routing protocols may have a higher priority with respect to OPS operation and may cause switching to these other routes. The systems and methods of the present disclosure are therefore configured to re-route communication through the preferred paths 176, 178, even after a route has been switched to a recovery path through these other routes. This strategy therefore overcomes some of the issues with the conventional systems to return routing back to these preferred paths 176, 178.

Figure 6:
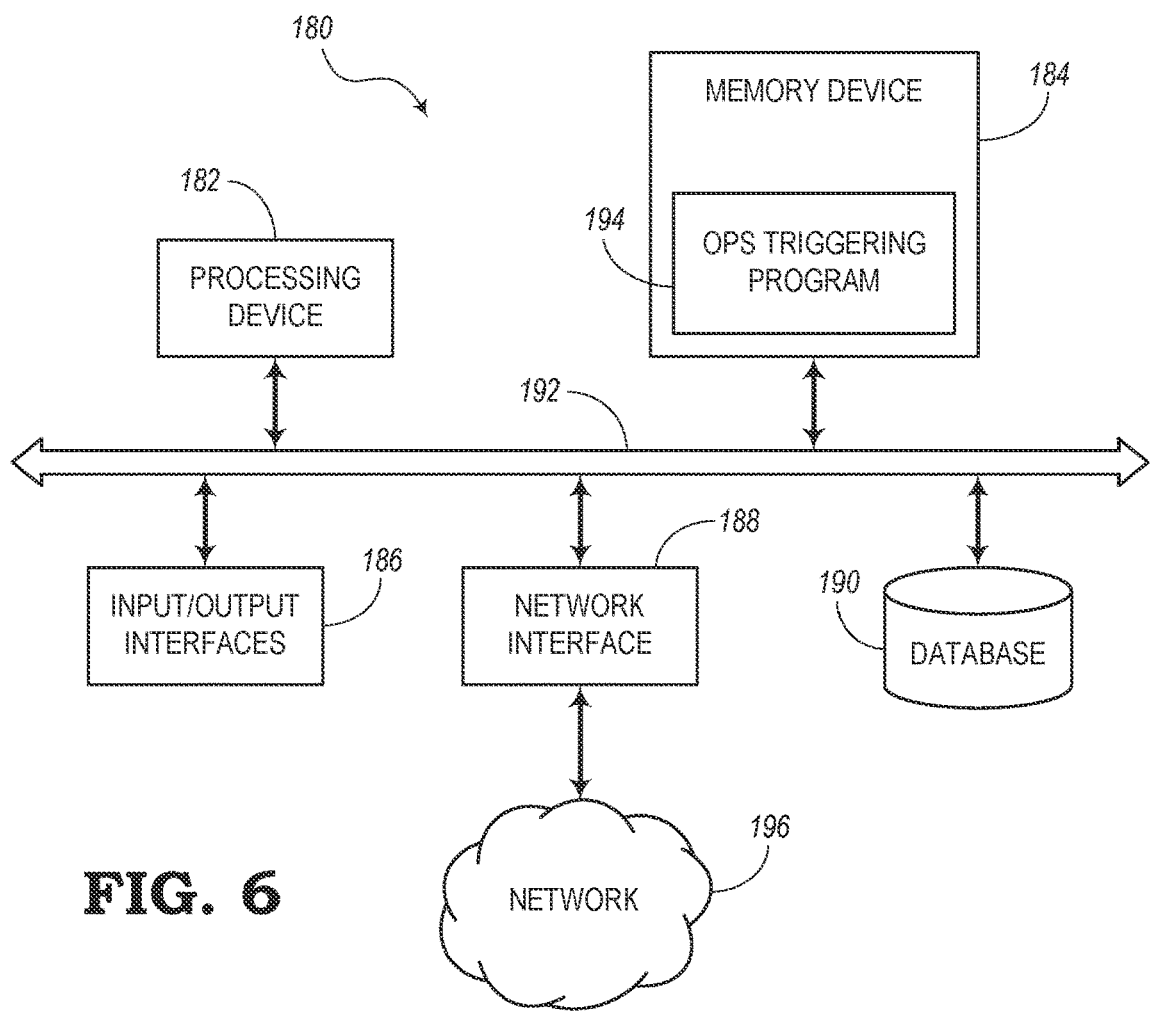
FIG. 6 is a block diagram illustrating a Domain Optical Controller (DOC) for performing an OPS policy, according to various embodiments.

FIG. 6 is a block diagram illustrating an embodiment of a Domain Optical Controller (DOC) 180 for performing an OPS policy. The DOC 180 may be configured to operate in a Control Plane (CP) with respect to a network or system, such as in systems and networks 40, 90, 170, etc. In the illustrated embodiment, the DOC 180 may be a digital computing device that generally includes a processing device 182, a memory device 184, Input/Output (I/O) interfaces 186, a network interface 188, and a database 190. It should be appreciated that FIG. 6 depicts the DOC 180 in a simplified manner, where some embodiments may include additional components and suitably configured processing logic to support known or conventional operating features. The components (i.e., 182, 184, 186, 188, 190) may be communicatively coupled via a local interface 192. The local interface 192 may include, for example, one or more buses or other wired or wireless connections. The local interface 192 may also include controllers, buffers, caches, drivers, repeaters, receivers, among other elements, to enable communication. Further, the local interface 192 may include address, control, and/or data connections to enable appropriate communications among the components 182, 184, 186, 188, 190.

It should be appreciated that the processing device 182, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 182 may also include or utilize stored program instructions (e.g., stored in hardware, software, and/or firmware) for control of the by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 184 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory device 184 may incorporate electronic, magnetic, optical, and/or other types of storage media. The memory device 184 may have a distributed architecture, where various components are situated remotely from one another, but can be accessed by the processing device 182.

The memory device 184 may include a data store, database (e.g., database 190), or the like, for storing data. In one example, the data store may be located internal to the DOC 180 and may include, for example, an internal hard drive connected to the local interface 192 in the DOC 180. Additionally, in another embodiment, the data store may be located external to the DOC 180 and may include, for example, an external hard drive connected to the Input/Output (I/O) interfaces 186 (e.g., SCSI or USB connection). In a further embodiment, the data store may be connected to the DOC 180 through a network and may include, for example, a network attached file server.

Software stored in the memory device 184 may include one or more programs, each of which may include an ordered listing of executable instructions for implementing logical functions. The software in the memory device 184 may also include a suitable Operating System (O/S) and one or more computer programs. The O/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 182), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 182 or other suitable circuitry or logic). For example, when executed, the instructions may cause or enable the processing device 182 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., processing device 182), or any suitable combination thereof. Software/firmware modules may reside in the memory device 184, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O interfaces 186 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces 186 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an InfraRed (IR) interface, a Radio Frequency (RF) interface, and a Universal Serial Bus (USB) interface.

The network interface 188 may be used to enable the DOC 180 to communicate over a network 196, such as the mesh network 170, systems 40, 90, the Internet, a Wide Area Network (WAN), a Local Area Network (LAN), and the like. The network interface 188 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface 188 may include address, control, and/or data connections to enable appropriate communications on the network 196.

Furthermore, the DOC 180 includes an OPS triggering program 194, which may be configured to trigger or initiate certain OPS operations even in the presence of other routing protocols operating on the network 196. The OPS triggering program 194 may be at least partially implemented in software and/or firmware and stored in suitable memory (e.g., memory device 184, database 190, etc.) The OPS triggering program 194 may be at least partially implemented in hardware and configured in the processing device 182. In other embodiments, the OPS triggering program 194 may be implemented in any suitable combination of hardware, software, firmware, etc. and configured to perform OPS policies described in the present disclosure.

Figure 7A:
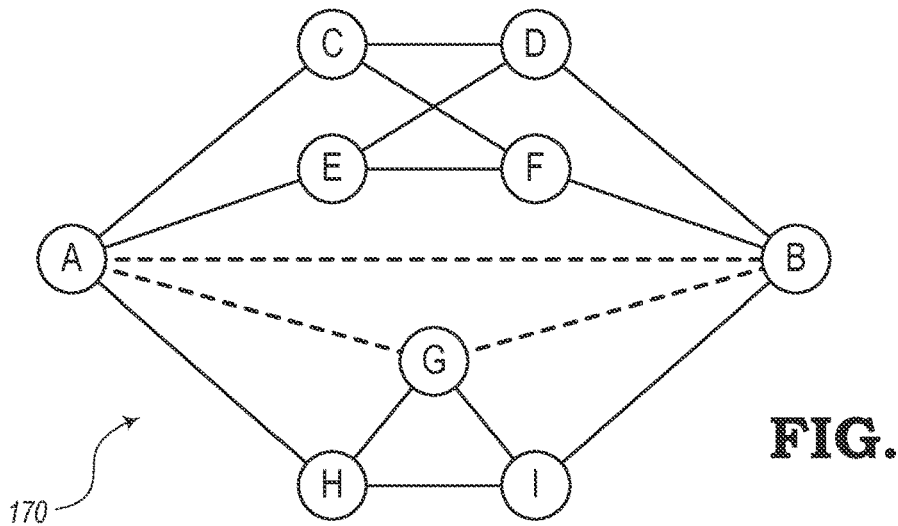
FIGS. 7A-7F are diagrams illustrating a sequence of path switching operations for demonstrating an example of an issue with conventional systems with respect to the arrangement of NEs shown in FIG. 5.
Figure 7B:
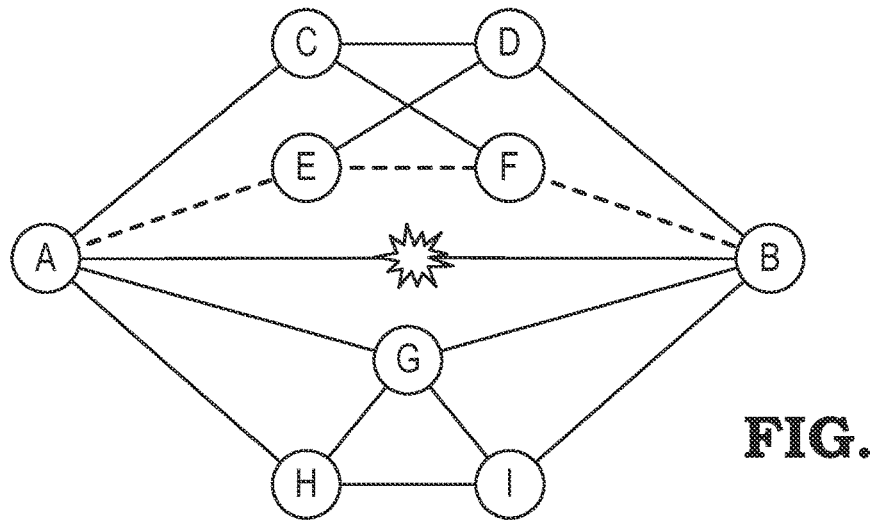
Figure 7C:
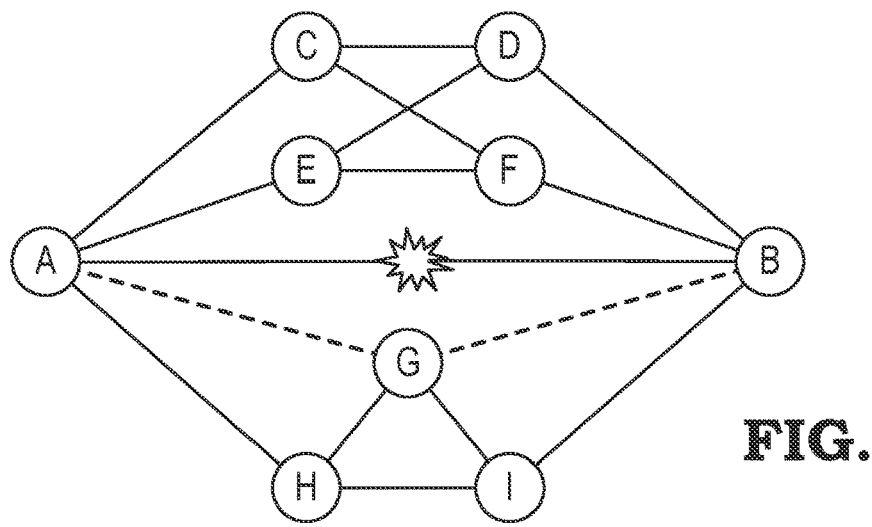
Figure 7D:
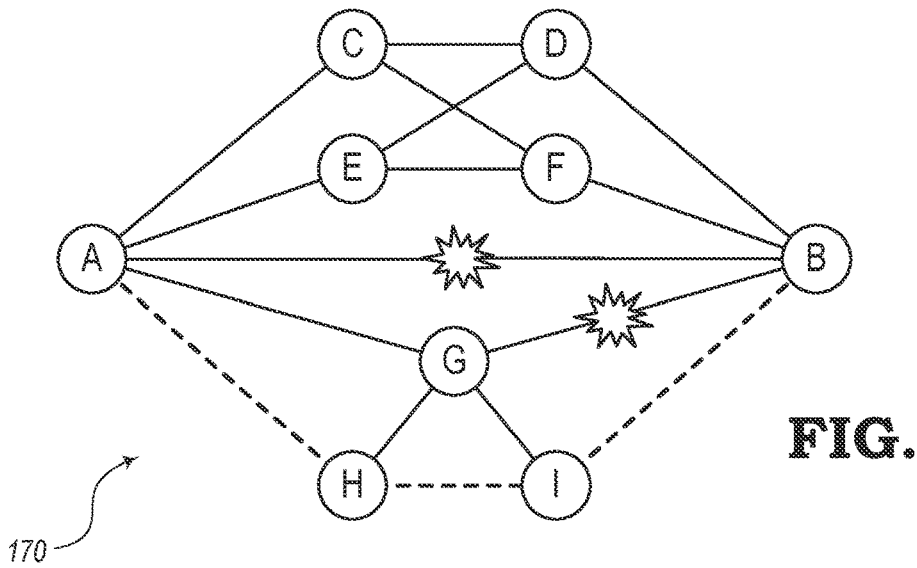
Figure 7E:
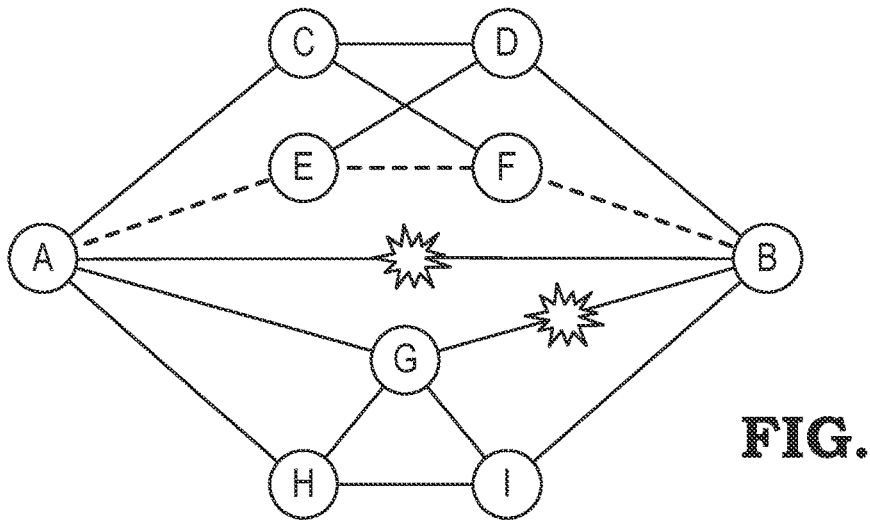
Figure 7F:
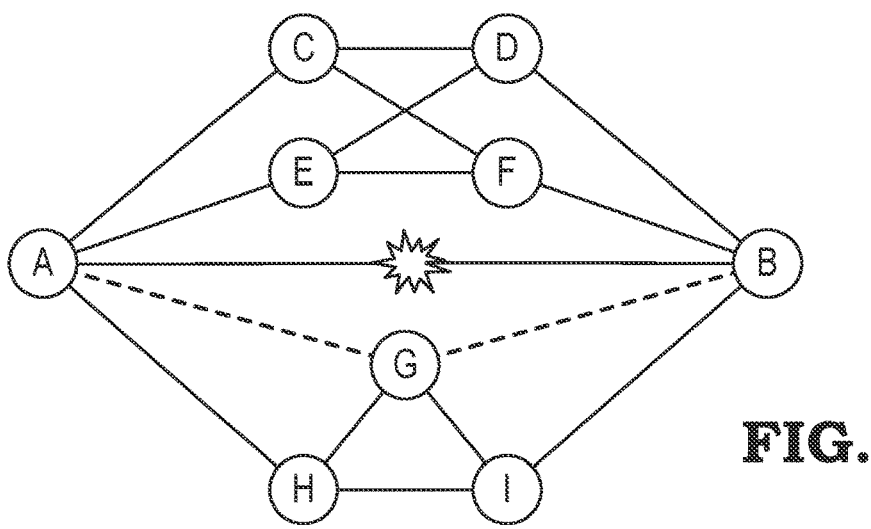

FIGS. 7A-7F are diagrams illustrating an example of a sequence of path switching operations for demonstrating issues with conventional systems with respect to the arrangement of NEs shown in FIG. 5. Also, FIG. 7F shows a solution as provided by the systems and methods of the present disclosure for overcoming some of the issues of the conventional systems.

The problem of the conventional systems can also be understood by considering a 1+1+R (SNCP) service running between Nodes A and B as shown in FIG. 7A. An OPS device may be placed on a transponder client or line side to provide 1+1 switching within 50 ms. A first Sub-Network Connection (SNC1) has a home path including the working path 176 (e.g., home route A-B) and the protection path 178 (e.g., home route A-G-B), as shown in FIGS. 5 and 7A.

As shown in FIG. 7A, the working path 176 is the active path. If a fault or degradation (e.g., fiber cut) is detected on this active path SNC1, which is part of the OPS home path, another routing protocol (other than OPS) may have a higher priority than OPS and may be configured to automatically switch to a backup or restoration path A-E-F-B, as shown in FIG. 7B. Although OPS is a lower priority than this other protocol, OPS will then operate to switch traffic to its protection path 178 (A-G-B) (e.g., SNC2) as shown in FIG. 7C.

At a later time, for instance, suppose that the protection path 178 also experiences a fault or degradation (e.g., fiber cut) on SNC2. Also, suppose that another routing protocol (e.g., same or different protocol used for switching to A-E-F-B as shown in FIG. 7B) is configured to automatically switch from A-G-B to a backup or restoration path A-H-I-B as shown in FIG. 7D. At this point, the OPS operation may normally wish to switch to SNC1 (A-B), but may detect that this path still includes a fault or degradation that would affect the service and thereby prevent switching back to the working path 176. Nevertheless, normal OPS operation may include switching traffic to the backup path A-E-F-B associated with the working path 176 (SNC1), as shown in FIG. 7E.

Suppose, at a later time, that the fault or degradation on the protection path 178 (A-G-B) is cleared or resolved. At this point, the protection path 178 is back on its home path, which may be after a Wait-to-Restore (WTR) timer has expired in the case of a revertive switching scheme. In some embodiments, the terminating node (e.g., Node B) may be configured to use the WTR mechanism to wait for a certain duration and determine during this time if any defects, faults, degradations, etc. have been detected. If a defect is detected, the terminating node will need to restart the WTR timer until no defects or faults are present for the entire WTR time period (e.g., 5 to 12 minutes), at which point the terminating node can proceed with reverting traffic from its protection-switched path back to its primary path, working path, or home path.

The conventional systems are typically unable to detect the change in the status of the protection path 178 and will continue to run on A-E-F-B (FIG. 7E). Since this path is not part of the home path and may include certain disadvantages compared to the home path, it would be beneficial, as described in the present disclosure, to switch back to the protection path 178, especially if this path is preferred over the other currently-running route (e.g., A-E-F-G). The current solution, described with respect to the present disclosure, solves the problem, which can be desirable for customer networks having large Layer 0 Control Plane (L0CP) mesh networks (e.g., mesh network 170), which may have significant differences between working and restoration routes with respect to latency, distances, OSNR, etc.

Also, the conventional OPS operation will be pointing to SNC1, the traffic is not running on its home path. As there is no such mechanism in the conventional systems to instruct OPS to switch and start getting traffic from SNC2 running on its home path, the conventional systems may experience longer latency and travel distances, while the OSNR may be less compared with SNC1. It would therefore be beneficial to get traffic up on the OPS home path because of many reasons, such as latency requirements, Service Level Agreements (SLAs), link budgeting, etc.

With respect to FIGS. 2-4 regarding different OPS protection configurations, the problem for client OPS and transponder line (e.g., channel) OPS policies (particularly the embodiments described with respect to FIGS. 2 and 3), the DOC 180 of the present disclosure (e.g., particularly the OPS triggering program 194) can resolve the conventional issues by providing an intelligent mechanism at the L0CP to trigger the OPS to switch traffic by introducing a new technique or algorithm associated with the OPS triggering program 194. For example, the OPS triggering program 194 may be configured to utilize a new technique, referred to herein as a Control Plane Triggered OPS (CPT-OPS) policy.

For example, the DOC 180 is configured to provide a mechanism that can be implemented on both the originating node (e.g., Node A) and the terminating node (e.g., Node B) of some network service on the system or network (e.g., mesh network 170). The CPT-OPS policy or algorithm is configured to detect which Sub-Network Connection Protection (SNCP) leg (e.g., working path 176 or protection path 178) is up on its OPS home path. Accordingly, the DOC 180 is configured to pass information to OPS devices (e.g., OPS devices 44, 68, 94, 98, etc.) to switch the traffic or stay on its current route.

For any kind of restoration and/or fault policies (e.g., manually or automatically triggered), the DOC 180 is configured on L0CP to keep track of whether a particular SNCP leg is running on its OPS home path or another restoration path (non-home path). In the case where a corresponding service switches to its home path and gets optimized in the DOC 180, such as using a verification technique (e.g., using end-to-end diagnostics) by an optical switching and routing protocol, or in the case where the corresponding service recovers from any fault on its home path, the DOC 180 operating in L0CP may be configured to check if a peer leg (e.g., path 176 or 178) is up and running on its home path and is optimized. The DOC 180 (e.g., using any suitable optical switching and routing protocol) may already verify SNCP peer leg status from its end-to-end diagnostics information. For example, the diagnostics may include determining whether there is no fault, no Receiver (Rx) fault, no transponder (TRP) fault, and the SNC is optimized. This may be done prior to triggering a switch under CPT-OPS operation. If this is not the case, then the DOC 180 may be configured trigger the OPS switch.

The CPT-OPS automatically triggered operation may be performed by the DOC 180 by a) informing the terminating node to perform the CPT-OPS switching action, and b) trigger the OPS switching action by sending a CPT-OPS switch request towards the transponders on both the originating node (e.g., Node A) and terminating node (e.g., Node B). For this purpose, OPS triggering program 194 of the DOC 180 may be configured to utilize a new parameter, which may be referred to as "OPS-trigger," "OPS-SWITCH," or other suitable names. The OPS-trigger for L0CP services may constitute the use of an SNCP. The OPS-trigger parameter may include a status of either ENABLED or DISABLED.

The DOC 180 of the control plane may perform certain decision-making actions based on these parameters, as follows:

ENABLED—the DOC 180 in this state is configured to perform CPT-OPS switching once the corresponding service gets optimized by the DOC 180 on its home path, provided that the other leg is running on its protect path (e.g., protection path 178).

DISABLED—the DOC 180 in this state is configured not to perform any CPT-OPS switching actions.

In revertive switching operation, the DOC 180 may be configured to use the WTR parameter, which may be a value defined by a network administrator or a default value (e.g., one minute). This value may be used along with the CPT-OPS request, while enabling the OPS-trigger for L0CP. It may be noted that a combination of revertive OPS configuration along with OPS-trigger for L0CP may be prohibited in conjunction with each other.

So as to enable the DOC 180 to trigger OPS switching (e.g., using the OPS-trigger parameter), the DOC 180 (operating in the L0CP) may be configured to trigger the corresponding OPS switches. In some embodiments, the DOC 180 may be configured to introduce a new message between optical switching protocols, routing protocols, and topology (e.g., OPS devices and transponders), which may be defined as the OPS-trigger request or OPSSWITCH request.

For example, the OPS triggering program 194 may be configured to perform an OPS-trigger operation, which may include sending the OPS-trigger request to the relevant topology (e.g., OPS devices and transponders), particularly in the case it may be necessary to switch according to the OPS operation. For line OPS operation or Transponder-Triggered OPS (TT-OPS) configurations, the topology, upon receiving the OPS-trigger request from the DOC 180, will check if the transponder is connected to add/drop port of the CMD device (e.g., CMD device 48, 56, 72, 80, etc.). If so, then it will send this request to the transponder (e.g., via a service and photonic layer integration). To do so, the OPS-trigger message can be used. The transponder, on receiving the OPS-trigger message may be configured to trigger the actual OPS switching action. The triggered OPS device can use an existing manual switch action, which may take a higher priority over OPS. If any existing manual switch operation is in place, then the DOC 180 may be configured to overwrite such manual switching action.

Furthermore, the OPS-trigger request, as controlled by the OPS triggering program 194, may be configured to keep the OPS device at a switching level that is at the same level as or at a higher level than the manual switching action. However, the OPS triggering may be kept lower than the other restoration or protection routing protocols (e.g., based on fault or signal degrade detection and automatic switching). With this level of priorities, the cooperating routing protocols may be configured to work together and can help to avoid any traffic disruption due to any existing OPS switch commands from a network administrator (e.g., force switch, fault, and lockout), whichever may be in place. In some scenarios, the OPS switching request can be declined by the system. Also, the OPS policy described in the present disclosure, in the case of an existing client fault on a transponder, the CPT-OPS switch request shall be declined by the system to avoid any traffic disruption since the CPT-OPS request might be at a lower priority than the auto switching policy.

The OPS triggering program 194 may further be configured such that a client level flag can be introduced. For example, the client level flag may be configured to handle individual clients on a multi-client transponder service. Client protection (CPT-OPS) may have an additional flag to cater the CPT-OPS trigger from some protocol (e.g., optical switching and routing) which can work in conjunction with CPT-OPS configurations. This may help in applying CPT-OPS operations for protected clients in the cases where partial clients are protected on multi-client supported transponders in client OPS configuration. All non-CPT-OPS clients may continue to operate on their existing paths.

The OPS triggering program 194 may be also understood by consider the example shown with respect to FIGS. 7A-7F. In some embodiments, the OPS-trigger parameter may be enabled on the SNC and the DOC 180 running on L0CP may be configured to perform the following set of actions:

1. With OPS-trigger enabled, once SNC2 reverts to its home path A-G-B and is optimizes in the DOC 180, the OPS triggering program 194 may be configured to checks if a peer leg (e.g., working path 176, SNC1, etc.) is running on its home path.
2. The OPS triggering program 194 is configured to find that the leg (e.g., SNC1) is up on its protection/backup path A-E-F-B and is optimized by the DOC 180.
3. The OPS triggering program 194 is configured to inform the terminating node (e.g., Node B) to send the OPS-trigger request to the topology (e.g., OPS device and/or transponder).
4. Both the originating node (e.g., Node A) and terminating node (e.g., Node B) are configured to forward the OPS-trigger request to its respective topology.
5. The respective topologies are configured to trigger its respective OPS device to switch traffic towards SNC2 that is running on its home path.

The above technique ensures the OPS triggering program 194 can switch traffic on a corresponding SNCP leg that is up and running on its home path in embodiment involving 1+1 service (e.g., SNCP), provided that at least one leg is up and running on its home path and optimized.

It may be noted that the extra switching may result in a slight additional traffic hit. However, when a L0CP path would be reverted anyway, this would also cause the same hit for such a switching action. Over a period, it may be noted that this may not be significant. Also, this OPS-trigger may be a flag-based enabling process. Customers (e.g., network administrators) may be informed of the features described herein and could thereby learn in advance that this will take place. Also, the embodiments of the present disclosure may result in extra messaging between modules using existing framework. This may include one message per mesh restoration, which may use the framework that is already present across participating modules. The framework involved can be updated to enable the introduction of these new message types.

The systems and methods of the present disclosure also include several advantages. For example, the DOC 180 may be configured to enforce a "best path" policy for selecting a path that is recommended by a first party (1P) or by a user-selected preferred home path to route traffic. Also, traffic can be automatically switched to customer preferred paths, which may be shortest paths or customer-defined optimal paths. Preferred paths may also be based on planned link budget routes or planned route diversity and better performance path.

The embodiments of the present disclosure can also be used with networks that do not provide service and photonic layer integration. A Control Plane System (CPS), such as the DOC 180, may be configured to forward the OPS-trigger message to a Network Management System (NMS), Network Operations Center (NOC), or other management or control facilities where a network administrator or network operator can instruct a corresponding transponder, which is configured to respond to the OPS-trigger requests as described herein, to switch to back to a home path.

It may be noted that many companies (e.g., service providers) may benefit from the advantages that the present embodiments are configured to offer. These companies may include largely deployed SNCPs, as described with respect to FIGS. 2 and 3, in their networks. In regional networks, companies may opt for a lowest latency home route for the working and protection legs (e.g., paths, routes, etc.). In such cases, the network administrator for these companies may wish to latch OPS operations to the home path of either leg if the corresponding SNC leg is up and running on its home path.

Considering an example of one company with a regional super collector network, a working route (e.g., service leg or working route of a home path) may include a distance of about 400 km and a protection route (e.g., protect route of the home path) may include a distance of about 450 km. These routes may be designated as the preferred routes or home path. Also, multiple other restoration paths may be available if a primary link is down. In this example, these other restoration paths may range in distance from about 800 km to about 1000 km.

With this arrangement, suppose the working route goes down. If the working leg goes for a L0 restoration due to a fault, traffic may be moved from the 400 km link to the 450 km link due to an OPS switching action. Also, suppose that the working leg gets restored to the 900 km link for a restoration path that incidentally adds an additional 500 km to the distance of the route. If a fault is detected on the protection leg's home route as well, then the OPS policy may switch again. For example, suppose traffic is moved to the working leg's restoration path of 900 km, which adds an additional distance of about 450 km compared with the protection leg's home. In some cases, this may end up adding an additional latency to the traffic route as well as a degraded OSNR characteristic.

Suppose, for example, that the fault or degradation on the protection leg's home path is fixed. When the protection leg's home path is fixed, the traffic is reverted back to home path, which has now lower latency compared to working leg's restoration path. However, due to OPS device latched to the working leg's restoration path, traffic may be ceased to remain active on the longer path.

In some embodiments, the OPS triggering program 194 may be configured to utilize the Control Plane Trigger OPS (CPT-OPS) request mechanism to switch the traffic back to the protection leg's home path, which has the lower latency and better OSNR as opted by the network administrator as the preferred service path. Thus, this capability will provide customers with a better availability, an ability to better meet Service Level Agreements (SLAs), and maximized uptime over these lower-latency and better-OSNR preferred paths, which can be opted by the network administrator ahead of time for routing their services as desired.

Thus, as mentioned above, the DOC 180 can be configured to introduce a new parameter (e.g., T1 parameter), referred to as "OPS-trigger" for L0CP services. The parameter can be either ENABLED (applicable only for services constituting SNCP connections) or DISABLED. The Control Plane (CP), operating in parallel with data packet transmitting systems, can perform the OPS switching policies described in the present disclosure once the corresponding service gets optimized on its home path provided that its peer leg is up and running on its protection path. The DOC 180 is also configured to add the new OPS-trigger request between a protocol for optical switching and routing and the topology of the NE. The optical switching and routing protocol(s) can send the OPS-trigger request to the topology when it is needed to switch the OPS device. Also, the optical switching and routing protocol(s) can perform the following set of actions at the originating node (as described with respect to FIG. 8) if the OPS-trigger parameter is enabled on a service that constitutes SNCP.

Figure 8:
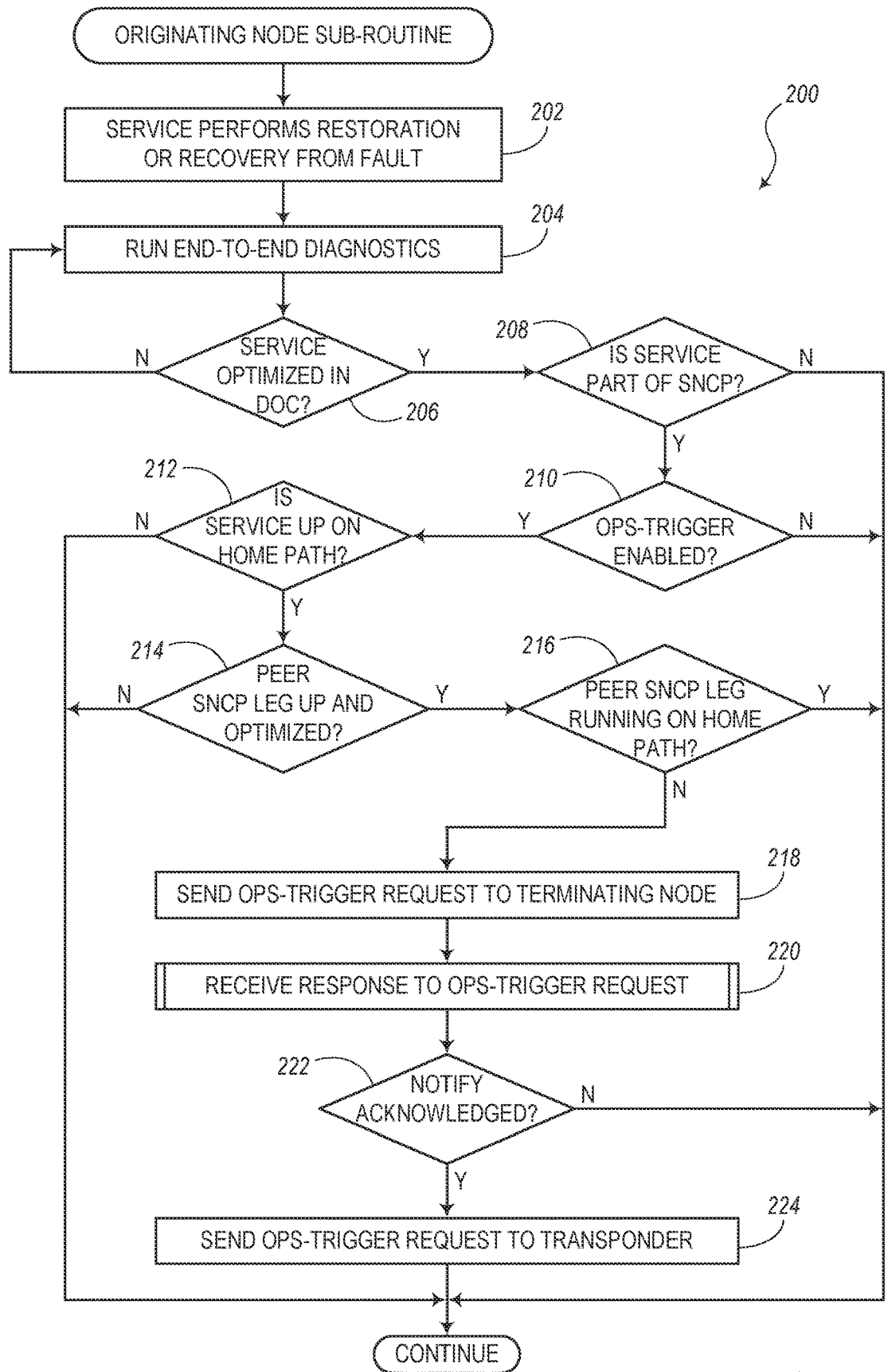
FIG. 8 is a flow diagram illustrating a sub-routine associated with an originating node, according to various embodiments.

FIG. 8 is a flow diagram illustrating an embodiment of process 200 including a sub-routine associated with the originating node (e.g., Node A). The process 200 is configured to be run on the originating node and may include aspects of a control plane for controlling the originating node. The process 200 can be performed for each service that belongs to an SNCP after it performs restorations during any fault or manual operations or recovers from any fault on its home route.

The process 200 includes allowing a service to automatically perform restoration or recovery from a fault, as indicated in block 202. The process 200 also include running end-to-end diagnostics on the system or network between the originating node and the terminating node, as indicated in block 204. The decision block 206 indicates that the process 200 determines if the service has been optimized in the DOC (e.g., DOC 180). If not, the process 200 returns back to block 204 until the service is optimized. When the service is optimized, the process 200 proceeds to decision block 208.

Decision block 208 determines if the service is part of a Sub-Network Connection Protocol (SNCP), such as a leg of the SNCP. If not, the process 200 goes to the end and continues for the terminating node. If the service is part of the SNCP, the process 200 goes to decision block 210, which is configured to determine if the OPS-trigger is enabled. If not, the process 200 goes to the end. If enabled, the process 200 goes to decision block 212, which includes the step of determining if the service is up on the home path. If not, the process 200 goes to the end. If so, the process 200 goes to decision block 214, which includes the step of determining if the peer SNCP leg is up and optimized (by the DOC). If not, the process 200 goes to the end. If so, the process 200 goes to decision block 216, which includes the step of determining if the peer SNCP leg is running on the home path. If so, the process 200 goes to the end. If not, the process goes to block 218.

As indicated in block 218, the process 200 includes the step of sending an OPS-trigger request to the terminating node. This may include sending an OPS-trigger notify message towards the terminating node so as to cause this node to perform an OPS switching action. Then, the process 200 includes the step of receiving a response to the OPS-trigger request (from the terminating node), as indicated in block 220. Once an OPS-trigger response comes back, block 220 may include the step of checking if it is a notify ACK. At this point, the process 200 includes determining if there is indication that the notification has been acknowledged, as indicated in decision block 222. If not, the process 200 goes to the end. If so, the process 200 goes to block 224, which includes the step of sending the OPS-trigger request to the transponder (or OPS device or other suitable part of the topology) and the process 200 ends. At the end of the process 200, another process or sub-routine may be executed for operations associated with other nodes of the system or network.

Between the originating node (e.g., Node A) and the terminating node (e.g., Node B), there may be one or more intermediate nodes or pass-through nodes (e.g., Nodes C, D, E, F, G, H, I). According to various embodiments, the pass-through nodes are not configured to take any action with respect to the OPS operations. Thus, when an OPS-trigger request is provided or when there is a notification message regarding an acknowledgement (ACK), the pass-through nodes simply pass messages between the originating and terminating nodes as needed according to corresponding types of OPS-trigger requests.

Figure 9:
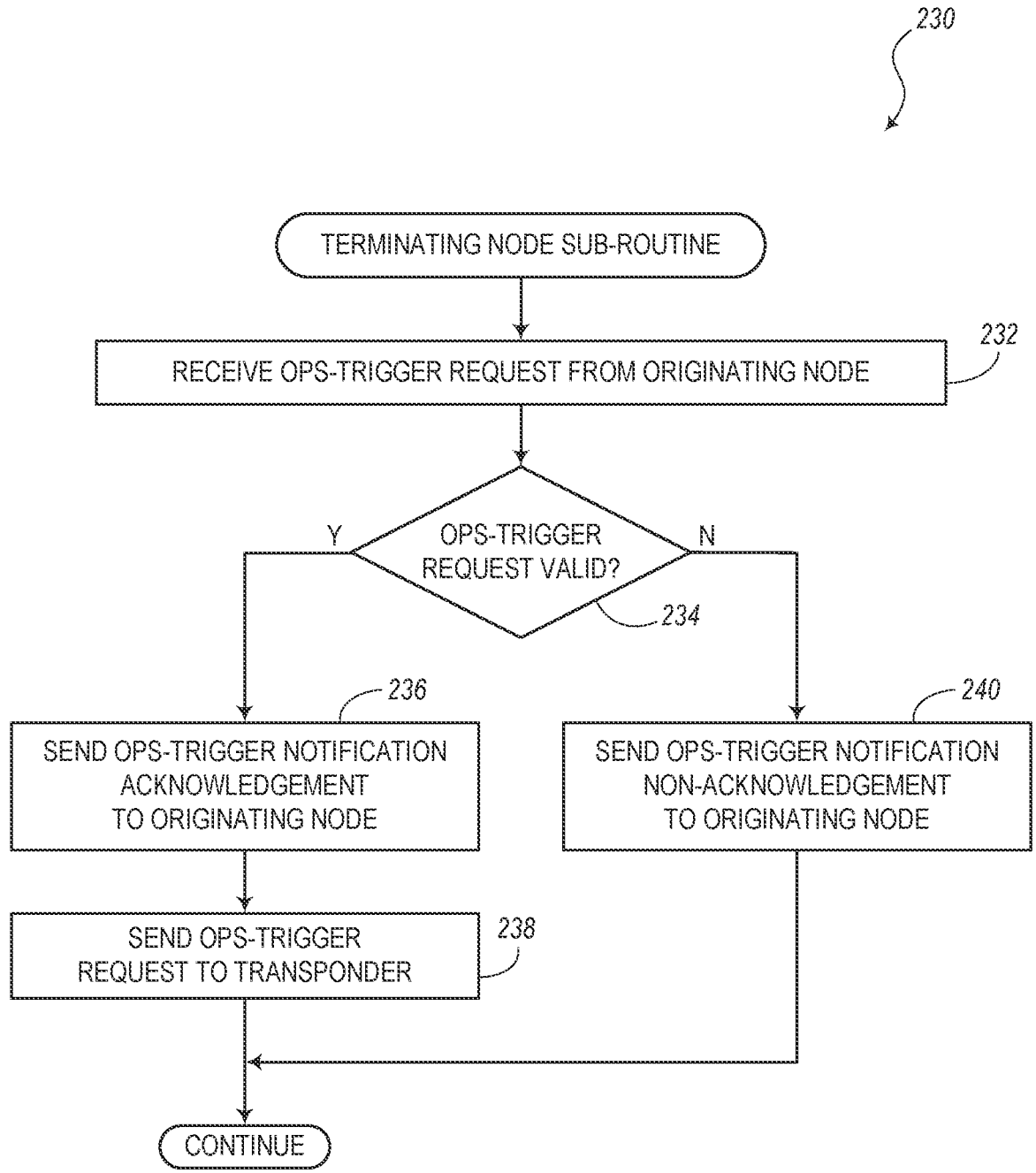
FIG. 9 is a flow diagram illustrating a sub-routine associated with a terminating node, according to various embodiments.

FIG. 9 is a flow diagram illustrating an embodiment of a process 230 including a sub-routine associated with a terminating node. The process 230 may be executed upon the condition that the terminating node receives an OPS-trigger request (or NOTIFY message) from the originating node, such as is described with respect to block 218 shown in FIG. 8. In the embodiment of FIG. 9, the process 230 includes receiving an OPS-trigger request from the originating node, as indicated in block 232. The process 230 further includes decision block 234, which indicates the step of determining whether the OPS-trigger request is valid. If it is determined that the request is valid, the process 230 proceeds to block 236, which includes the step of sending an OPS-trigger notification acknowledgement, which acknowledges receipt of the request, back to the originating node (see block 220 shown in FIG. 8). The process 230 then includes the step of sending the OPS-trigger request to the appropriate component on the topology of the terminating node, such as a transponder (or OPS device). This step is described generally in block 238 and may be configured to initiate the sub-routine described with respect to FIG. 10. After this, the sub-routine ends.

If, however, the OPS-trigger request is determined to not be valid in decision block 234, then the process 230 goes to block 240. Block 240 includes the step of sending the OPS-trigger notification that acknowledgement is not made (non-acknowledgement). This notification is provided back to the originating node. After block 240, the sub-routine of the process 230 ends. After process 230, the OPS triggering program 194 may continue with performing additional sub-routines, such as the sub-routine associated with the transponders (or OPS devices) of the originating and terminating nodes, such as the process described with respect to FIG. 10.

Figure 10:
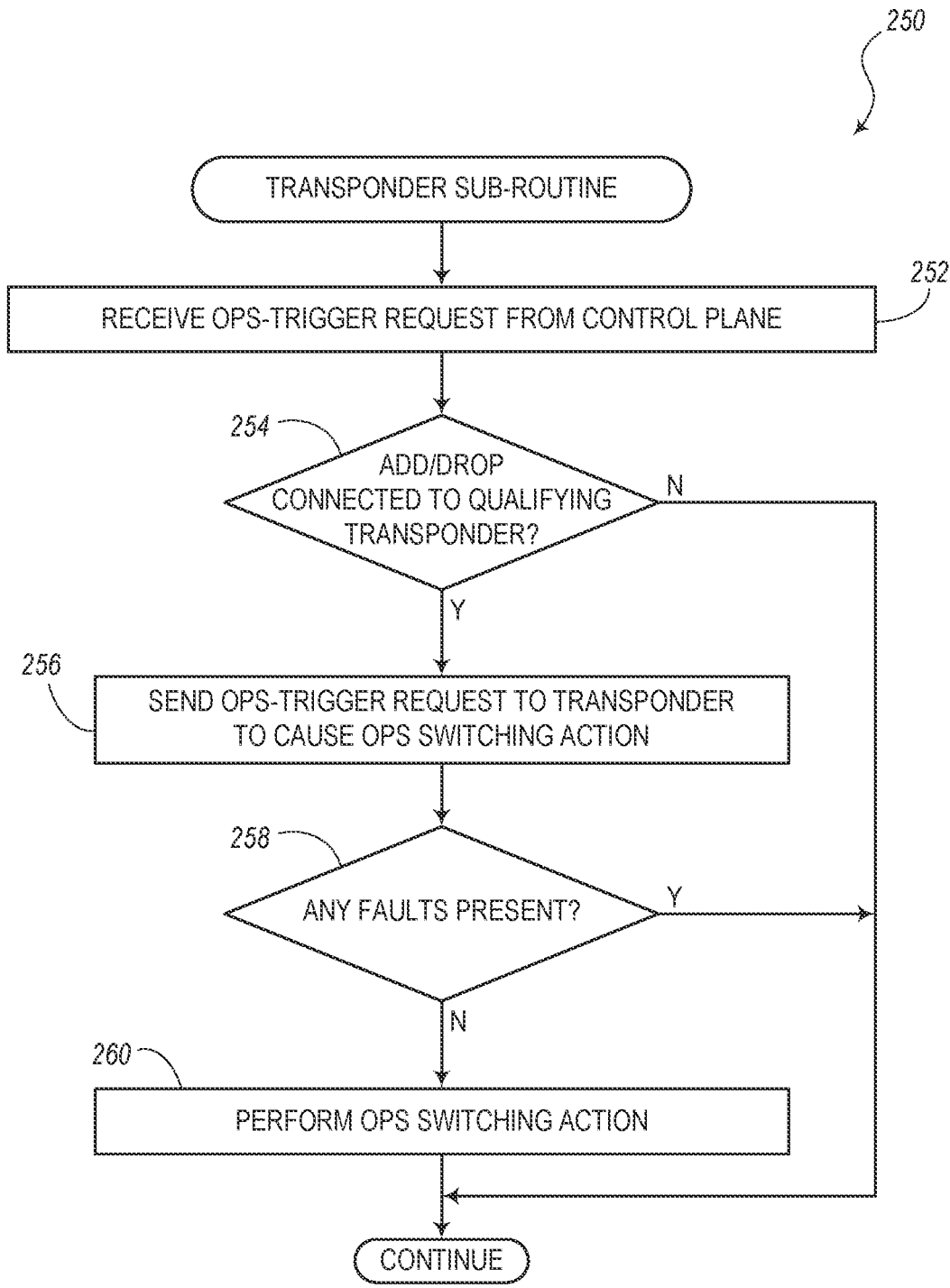
FIG. 10 is a flow diagram illustrating a sub-routine associated with a transponder of an originating node or terminating node, according to various embodiments.

FIG. 10 is a flow diagram illustrating an embodiment of a process 250 including a sub-routine associated with a transponder of an originating node or terminating node. It may be noted that FIGS. 8 and 9 are associated with actions at the originating and terminating nodes based on control plane actions. However, FIG. 10 may represent the actions on the physical layer (e.g., transponder) of one or both of the originating and terminating nodes.

According to the illustrated embodiment, the process 250 includes receiving the OPS-trigger request from the control plane, as indicated in block 252. The process 250 also includes determining, as indicated in decision block 254, if an add/drop device (e.g., CMD device) is connected to a qualifying transponder, which is configured to operate according to the systems and methods of the present disclosure. If it is determined that the add/drop is not equipped to respond to the OPS-trigger request, then the process 250 goes to the end. If the add/drop device qualifies, then the process 250 proceeds to block 256, which includes the step of sending the OPS-trigger request to the transponder (or OPS device or another suitable device of the topology of the respective node). Block 256 may be associated with an integration between a service and a photonic (optical) layer. Then, the process 250 includes the step of determining if any faults are present, as indicated in decision block 258. If so, the process 250 goes to the end. If no faults are present, the process 250 includes the step of performing an OPS switching action, as indicated in block 260, and then the process 250 (or transponder sub-routine) ends.

Figure 11:
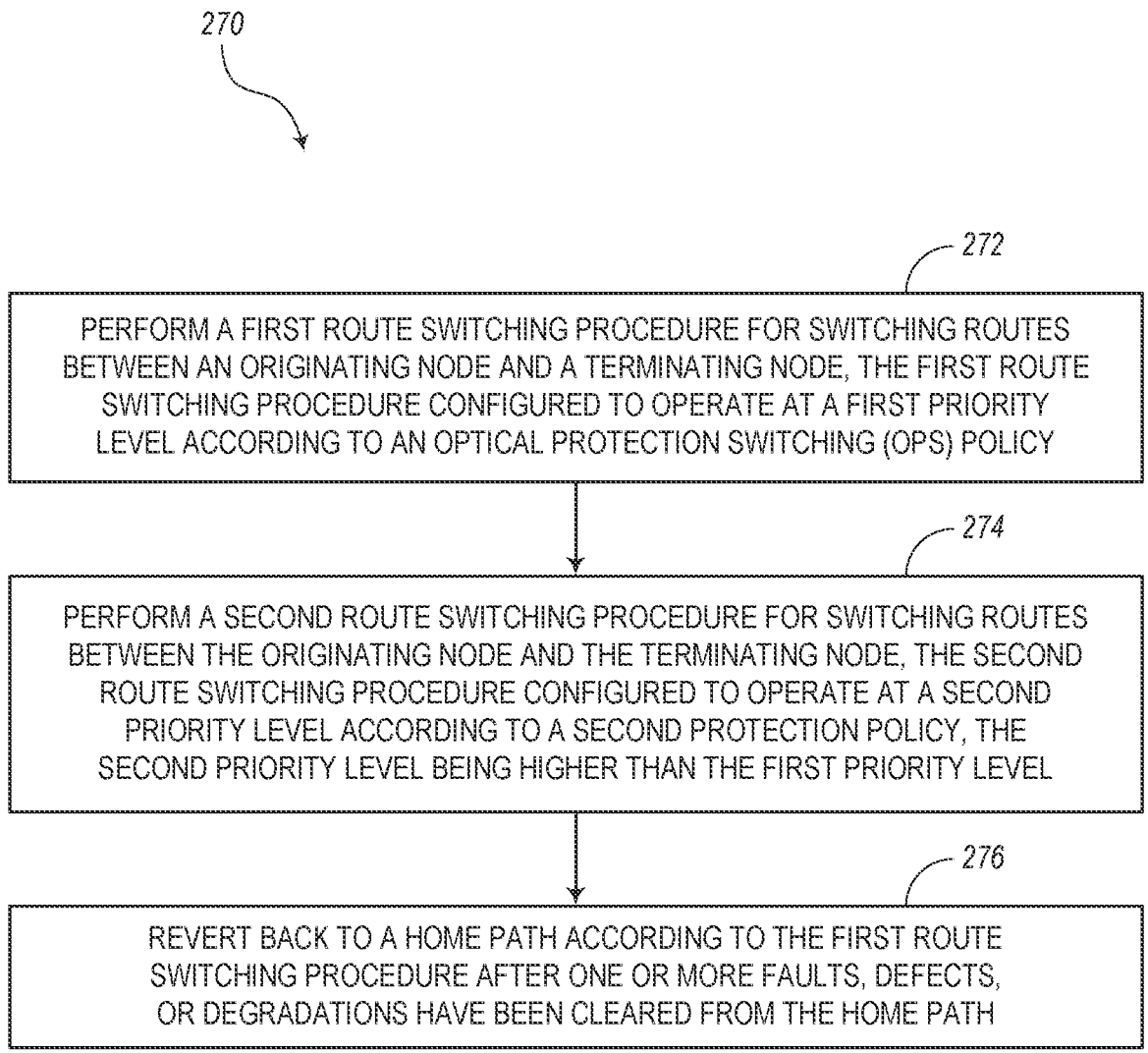
FIG. 11 is a flow diagram illustrating a general process for triggering an OPS operation, according to various embodiments.

FIG. 11 is a flow diagram illustrating an embodiment of a process 270, described in a general manner, for triggering an OPS operation. The process 270 includes a first step of performing a first route switching procedure for switching routes between an originating node and a terminating node, as indicated in block 272. For example, the first route switching procedure is configured to operate at a first priority level according to an Optical Protection Switching (OPS) policy. The process 270 also includes performing a second route switching procedure for switching routes between the originating node and the terminating node, as indicated in block 274. The second route switching procedure is configured to operate at a second priority level according to a second protection policy, where the second priority level is higher than the first priority level. In addition, the process 270 includes the step of reverting back to a home path according to the first route switching procedure after one or more faults, defects, or degradations have been cleared from the home path, as indicated in block 276.

In some embodiments, the process 270 may be configured to trigger an OPS request from a Layer 0 Control Plane (L0CP), which may be configured to control at least the originating node and terminating node. The process 270 may also send the OPS request to one or more transponders associated with each of the originating node and terminating node. The OPS policy may include a parameter for designating an enabled state or a disabled state, where the enabled state may be configured to allow the L0CP to perform a Control Plane Trigger (CPT) switching action (CPT-OPS) when service is optimized on the home path.

Also, according to various embodiments, the home path may include a working path and a protection path. Each path (e.g., the working path and the protection path) includes one or more Channel Multiplexer/Demultiplexer (CMD) devices, one or more Wavelength Selective Switching (WSS) devices, and one or more sets of line amplifiers. Furthermore, the process 270 may include detecting if paths are operational on the home path associated with the first route switching procedure and/or if paths are operational on a restoration path associated with the second route switching procedure. The process 270 may also include using end-to-end diagnostics from the originating node to the terminating node to determine optimized routes.

According to some embodiments, the first protection policy may be configured to operate in a revertive manner for automatically reverting back to the home path after a Wait-to-Restore (WTR) time has expired. The second protection policy, for example, may be an end-to-end dedicated 1+1 path protection/restoration protocol. For instance, the second protection policy may be a Sub-Network Connection Protection (SNCP) protocol. The process 270 may also include the step of receiving manual switching instructions (e.g., from a network administrator) according to a third route switching procedure. The third route switching procedure may be configured to operate at a third priority level below the first and second priority levels.

It may be noted that the systems and methods of the present disclosure are configured to include a number of aspects that distinguish these from the conventional systems and provides improvements over these conventional systems. Also, certain benefits can be achieved by using the systems and methods of the present disclosure.

The present disclosure provides systems and methods that have the capability for OPS to perform switching for select least L0CP latency path. The present disclosure provides and option (e.g., OPS-trigger parameter) on L0CP services to perform OPS switching once the corresponding service gets optimized on its home path, provided that the other leg is running on its protection path. The present system and methods provide functionality to ensure that traffic gets switched on the corresponding SNCP leg that is up on its home path, which may be selected by a first party (e.g., manufacturer) or a customer.

Additional novel aspects of the present disclosure include a new flag that is based on the configuration on the OPS to enable/disable the functionality based on OPS switching and client-based switching using CPT-OPS triggers. A new methodology or algorithm of the CPT-OPS can be configured to operate between the control plane and OPS. The OPS switching can be controlled by the CPS with qualifying and non-qualifying transponders (e.g., those configured according to the embodiments of the present disclosure and those that are not). Also, a new CPT-OPS trigger parameter may be used on a per-service layer and can be used to measure CPT-OPS switch counts. This may help customers drive the SLA for service support over customer-preferred home paths, which can provide lower latency and better OSNR response for the specific traffic through the respective system or network.

One advantage is that the systems and methods of the present disclosure are configured to help meet key requirements of customers, such as a condition that traffic is always preferred on corresponding home path for a particular service. Another benefit is that the present disclosure offers systems and methods that can meet latency-sensitive customer requirements (e.g., traffic should be on optimal path). The route switching policies and techniques of the present disclosure may also ensure paths having the least latency may be used, whereby these paths are configured to carry traffic as the home path is the optimal path. This feature could be a unique value that can be added for Control Plane applications. Also, this may provide better service availability (e.g., SLA) for maximum uptime over low latency/better OSNR preferred path opted by customers for routing their services.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A Domain Optical Controller (DOC) comprising:
a processing device, and
a memory device configured to store a computer program having instructions that, when executed, enable the processing device to
perform a first route switching procedure for switching routes between an originating node and a terminating node, the first route switching procedure configured to operate at a first priority level according to an Optical Protection Switching (OPS) policy,
perform a second route switching procedure for switching routes between the originating node and the terminating node, the second route switching procedure configured to operate at a second priority level according to a second OPS policy, wherein the second priority level is higher than the first priority level,
revert back to a home path according to the first route switching procedure after one or more faults, defects, or degradations have been cleared from the home path, and
trigger an OPS request from a Layer 0 Control Plane (L0CP) configured to control at least the originating node and terminating node and send the OPS request to one or more transponders associated with each of the originating node and terminating node.

2. The DOC of claim 1, wherein the OPS policy includes a parameter for designating an enabled state or a disabled state, the enabled state allowing the L0CP to perform a Control Plane Trigger (CPT) switching action (CPT-OPS) when service is optimized on the home path.

3. The DOC of claim 1, wherein the home path includes a working path and a protection path.

4. The DOC of claim 3, wherein each path of the working path and protection path includes one or more Channel Multiplexer/Demultiplexer (CMD) devices, one or more Wavelength Selective Switching (WSS) devices, and one or more sets of line amplifiers.

5. The DOC of claim 1, wherein the instructions further enable the processing device to detect if paths are operational on the home path associated with the first route switching procedure and/or if paths are operational on a restoration path associated with the second route switching procedure.

6. The DOC of claim 1, wherein the instructions further enable the processing device to use end-to-end diagnostics from the originating node to the terminating node to determine optimized routes.

7. The DOC of claim 1, wherein the first OPS policy is configured to operate in a revertive manner for automatically reverting back to the home path after a Wait-to-Restore (WTR) time has expired.

8. The DOC of claim 1, wherein the second OPS policy is an end-to-end dedicated 1+1 path protection/restoration protocol.

9. The DOC of claim 8, wherein the second OPS policy is a Sub-Network Connection Protection (SNCP) protocol.

10. The DOC of claim 1, wherein the instructions further enable the processing device to receive manual switching instructions according to a third route switching procedure, and wherein the third route switching procedure is configured to operate at a third priority level below the first and second priority levels.

11. A non-transitory computer-readable medium configured to store computer logic having instructions that, when executed, enable a processing device to:
perform a first route switching procedure for switching routes between an originating node and a terminating node, the first route switching procedure configured to operate at a first priority level according to an Optical Protection Switching (OPS) policy,
perform a second route switching procedure for switching routes between the originating node and the terminating node, the second route switching procedure configured to operate at a second priority level according to a second OPS policy, wherein the second priority level is higher than the first priority level,
revert back to a home path according to the first route switching procedure after one or more faults, defects, or degradations have been cleared from the home path, and
trigger an OPS request from a Layer 0 Control Plane (L0CP) configured to control at least the originating node and terminating node and send the OPS request to one or more transponders associated with each of the originating node and terminating node.

12. The non-transitory computer-readable medium of claim 11, wherein the OPS policy includes a parameter for designating an enabled state or a disabled state, the enabled state allowing the L0CP to perform a Control Plane Trigger (CPT) switching action (CPT-OPS) when service is optimized on the home path.

13. A non-transitory computer-readable medium configured to store computer logic having instructions that, when executed, enable a processing device to:
perform a first route switching procedure for switching routes between an originating node and a terminating node, the first route switching procedure configured to operate at a first priority level according to an Optical Protection Switching (OPS) policy,
perform a second route switching procedure for switching routes between the originating node and the terminating node, the second route switching procedure configured to operate at a second priority level according to a second OPS policy, wherein the second priority level is higher than the first priority level,
revert back to a home path according to the first route switching procedure after one or more faults, defects, or degradations have been cleared from the home path, and
trigger an OPS request from a Layer 0 Control Plane (L0CP) configured to control at least the originating node and terminating node, wherein the OPS policy includes a parameter for designating an enabled state or a disabled state, the enabled state allowing the L0CP to perform a Control Plane Trigger (CPT) switching action (CPT-OPS) when service is optimized on the home path.

14. The non-transitory computer-readable medium of claim 13, wherein the home path includes a working path and a protection path.

15. The non-transitory computer-readable medium of claim 13, wherein the instructions further enable the processing device to detect if paths are operational on the home path associated with the first route switching procedure and/or if paths are operational on a restoration path associated with the second route switching procedure.

16. The non-transitory computer-readable medium of claim 13, wherein the instructions further enable the processing device to use end-to-end diagnostics from the originating node to the terminating node to determine optimized routes.

17. The non-transitory computer-readable medium of claim 13, wherein the first OPS policy is configured to operate in a revertive manner for automatically reverting back to the home path after a Wait-to-Restore (WTR) time has expired.

18. The non-transitory computer-readable medium of claim 13, wherein the second OPS policy is an end-to-end dedicated 1+1 path protection/restoration protocol.

19. The non-transitory computer-readable medium of claim 13, wherein the instructions further enable the processing device to receive manual switching instructions according to a third route switching procedure, and wherein the third route switching procedure is configured to operate at a third priority level below the first and second priority levels.

* * * * *